(12) United States Patent
Takatori et al.

(10) Patent No.: US 6,778,654 B1
(45) Date of Patent: Aug. 17, 2004

(54) SYSTEM FOR TRANSFER CONTROL OF TELEPHONE LINE

(75) Inventors: Sunao Takatori, Tokyo (JP); Changmine Zhou, Tokyo (JP); Hisanori Kiyomatsu, Tokyo (JP)

(73) Assignee: Yozan Inc., Tokyo (JP)

(*) Notice: Subject to any disclaimer, the term of this patent is extended or adjusted under 35 U.S.C. 154(b) by 427 days.

(21) Appl. No.: 10/018,554

(22) PCT Filed: Jun. 14, 2000

(86) PCT No.: PCT/JP00/03869

§ 371 (c)(1),
(2), (4) Date: Dec. 20, 2001

(87) PCT Pub. No.: WO01/82094

PCT Pub. Date: Nov. 1, 2001

(30) Foreign Application Priority Data

Apr. 24, 2000 (JP) .................................... 2000-122791

(51) Int. Cl.[7] .......................................... H04M 3/42
(52) U.S. Cl. ........................ 379/212.01; 455/41.2; 455/461; 455/517; 455/519; 455/550.1; 455/554.1; 455/555
(58) Field of Search ........................... 455/41.2, 461, 455/517–519, 550.1, 554.1–555

(56) References Cited

U.S. PATENT DOCUMENTS

| | | | | |
|---|---|---|---|---|
| 5,670,950 A | * | 9/1997 | Otsuka | 455/411 |
| 5,805,999 A | * | 9/1998 | Inoue | 455/462 |
| 6,002,918 A | * | 12/1999 | Heiman et al. | 340/7.38 |
| 6,075,778 A | * | 6/2000 | Sugita | 370/335 |
| 6,352,361 B1 | * | 3/2002 | Nimberger et al. | 374/142 |
| 6,487,392 B1 | * | 11/2002 | Sonetaka | 455/11.1 |
| 6,570,489 B1 | * | 5/2003 | Gould et al. | 340/7.28 |
| 6,600,734 B1 | * | 7/2003 | Gernert et al. | 370/352 |
| 2001/0044295 A1 | * | 11/2001 | Saito et al. | 455/410 |
| 2003/0123413 A1 | * | 7/2003 | Moon et al. | 370/335 |

FOREIGN PATENT DOCUMENTS

| | | |
|---|---|---|
| JP | 63-7630 | 1/1988 |
| JP | 63-70630 | 3/1988 |
| JP | 7-38960 | 2/1995 |
| JP | 8-98240 | 4/1996 |

* cited by examiner

*Primary Examiner*—Ahmad F. Matar
*Assistant Examiner*—M. C. Ubiles
(74) *Attorney, Agent, or Firm*—Wenderoth, Lind & Ponack, L.L.P.

(57) ABSTRACT

A system for improving the level of service to the user, and billing according to user intentions while making effective use of telephone lines. The system includes a host computer (3) that controls communication services provided by telecommunications carriers, a base terminal (1) having base ID information which the host computer can identify, and a plurality of remote terminals (2A–2n.) having remote terminal ID information which the host computer can identify, to which control is transferred from the base terminal, and which communicate with the host computer. The base terminal (1) generates n remote IDs from which the host computer (3) can specify the base ID information based on the base ID information, for n remote terminals selected using the selection unit (12), and sends the generated remote IDs in turn to each remote terminal via a first communication device (4), and each remote terminal receiving the remote ID from the base terminal via the first communication device (5), appending remote terminal ID information, and sending the result to the host computer via a second communication device (23).

21 Claims, 3 Drawing Sheets

SYSTEM FOR TRANSFER CONTROL OF TELEPHONE LINE

TECHNICAL FIELD

The present invention relates to a telephone line control transfer system, and more specifically, to a system for transferring telephone line utilization rights from a base terminal, for example a portable telephone, to one or more remote terminals, to effectively use telephone lines.

BACKGROUND ART

In recent years, mobile communications terminal devices, such as portable telephones, personal handyphone systems (PHS), and personal digital assistants (PDA) have rapidly grown in popularity. As a consequence, it has become common for individuals to use two telephone lines separately in their day-to-day lives, one line being an ordinary wired household telephone line, and the other being the wireless line of a mobile communications terminal device.

Recent years have also seen an increase of the popularity of info-communications networks such as the Internet. As a result, users of info-communications networks have come to be able to receive a variety of services using the above-mentioned mobile communications terminal devices, including sending and receiving e-mails, obtaining various types of information, purchasing products, and making hotel and ticket reservations.

In addition, the next generation of portable telephone has recently been proposed in the form of a multi-functional terminal device equipped with such functions as reception of various broadcasts, video telephone, and navigation using multiple artificial satellites via the global positioning system (GPS). Another prediction for the shape of the next generation of portable telephones is the partition of a single line into multiple lines, and the offering of so-called multi-rate and multi-call functions, wherein various portable telephones use the same partitioned line, allowing the corresponding multiple portable telephones to communicate over the same line simultaneously.

This situation is predicted to expand the types of devices available to the users for receiving info-communications network services from the above-mentioned mobile communications terminals and PCs to televisions and other consumer electronics devices. It is also predicted that in the near future, info-communications network access functions will be built into all electrical appliances, and that these will be able to access info-communications networks via telephone lines and other means, for the purpose of data communications, billing processing by service providers, and the like.

This trend toward possession of multiple telephone lines, the addition of telephone functions to electrical appliances, and the like will make user authentication increasingly important Take the example of a case where an unspecified large number of users are at a meeting at work or in a similar situation, and in the room is located a common television, by means of which the users access an info-communications network and receive certain services. In this case, the parties that should be billed for these services are the unspecified large number of users who accessed the network, but in practical terms it is unfeasible to authenticate the parties who should be billed.

To contrast this situation, there is a system to provide a uniform service to the corresponding unspecified large number of users, who each utilize his own personal terminal device, and each of these plural devices accesses the info-communications network simultaneously using individual terminal device IDs specific to each terminal device. With this type of system, it is possible to identify each user to be billed. However, in this case it will be inconvenient if one desires to bill the costs of the service(s) to the company.

Meanwhile, there is a demand for mobile communications terminal devices to have such features which lead to ease of mobility as compact size and light weight. As a result, there have been a number of difficulties with their use. For example, a small keypad brought on by the downsizing of the unit made its operation difficult and mistakes easy to be made, and there are limits to the memory, the display area, and the time of continuous use.

Because of these problems, it would be preferable for the users indoors such as at home or in the office to use an electronic device suitable for accessing and receiving services over the info-communications network In this case, however, if new lines and IDs for the subscribers must be established for electronic devices other than mobile communications terminal devices, it would create more problems It would greatly complicate ID management and the base fees for utilization rights on a subscriber line would cost more For example, take a case that a user utilizes a portable telephone or other mobile communications terminal device to access an info-communications network and obtain a stock market report. The small size of the display area makes it impossible to make out and/or display the lines of graphs showing movements in stock prices, and other detailed information that is most important to the user. In this case, it would be appropriate to use a device with a large display screen, such as a television at home, in stead of the mobile communications terminal device in order to display this detailed information. This solution, however, necessitates that the television or other device be hooked up to a subscriber line, and that a user ID be established for that device as well. However, if all the family members use this home television to access an info-communications network and obtain a service—for example a ticket reservation. In this case, settings such as the user ID and other information must be modified for each family member, making management inconvenient.

Furthermore, if in the future all electrical products come to be equipped with the above-mentioned telephone functions, then each of these products will have to be allocated a separate telephone number and billed a base telephone fee. This would create a huge burden, both in terms of managing each telephone number and in terms of cost as well.

As shown here, present systems have great difficulty in effectively utilizing telephone lines and conducting billing that meets user intentions, despite the fact that even further development of mobile communications terminal devices in the near future can be assured.

DISCLOSURE OF THE INVENTION

The object of the present invention is to provide a system that helps improve the level of services for the users, effectively utilizing telephone lines and conducting billing that meets user intentions when utilizing the info-communication network.

The telephone line control transfer system according to the present invention has a host computer which controls communications services provided by telecommunications carriers; a base terminal having base ID information which the host computer can identify; and a plurality of remote terminals having remote terminal ID information which the host computer can identify, and which, upon receiving transfer of control from the base terminal, communicate with the host computer; the base terminal having a first communication means to communicate with each remote terminal; a selection means to select n remote terminals (n being an integer greater than or equal to 1) to which the control is to be transferred among the remote terminals which have communicated via the first communication means; and a control means to control the first communication means; the remote terminal having a first communication means to communicate with the base terminal; a second communication means to communicate with the host computer; and a control means to control the first communication means and the second communication means; the control means of the base terminal controlling the first communication means in order to generate n remote IDs based on the base ID information, from which the host computer can specify the base ID information, for n remote terminals selected using the selection means, and send the generated remote IDs in turn to each remote terminal; and the control means of each remote terminal controlling the second communication means in order to, upon receipt of the remote terminal ID from the base terminal via the first communication means, append the remote terminal ID information to the received remote terminal ID, and send the results thereof to the host computer via the second communication means.

Here the base ID information may be any information that allows the host computer to identify the base terminal, but preferably is the telephone number information of the base terminal's user.

In addition, providing the base terminal with a second communication means to communicate with the host computer allows the base terminal and remote terminals to communicate with the host computer simultaneously. Here, the base terminal communicates with the host computer via the second communication means, within a communication rate range pre-allocated by the host computer. In this case, the base terminal transfers control to n remote terminals, so that each of the remote terminals communicates simultaneously with the host computer via the second communication means, at a communication rate within the range pre-allocated by the host computer. Furthermore, in this case the base terminal, upon transferring control, may specify the communication rate to use with the second communication means for at least one of the n remote terminals.

When providing the second communication means for the base terminal, the base terminal may transfer control so that the second communication means of the base terminal and the second communication means of each of the n remote terminals communicate simultaneously with the host computer, within the communication rate range pre-allocated by the host computer.

In this case, the base terminal, upon transferring control, may specify the communication rate to use with the second communication means for the base terminal and/or at least one of the n remote terminals.

The base terminal is constituted in such a manner that the control means controls the first communication means to send the remote terminal IDs, authentication information, and control content information showing control content to be transferred, to each of n remote terminals selected via the selection means.

In addition, the base terminal includes a display means to display a list of remote terminals which have communicated via the first communication means, and a configuration input means to configure n remote terminals from among the list of remote terminals displayed by the display means, to which control is to be transferred.

Meanwhile, the host computer has a communication rate monitoring unit which monitors the combined communication rate of communications by the base terminal and each of the n remote terminals via each second communication means, and adjusts this rate so that it falls within the communication rate range pre-allocated to the base terminal.

Here, in the event that the combined communication rate of communications by the base terminal and each of the n remote terminals via each second communication means exceeds the communication rate range pre-allocated to the base terminal, the communication rate monitoring unit of the host computer either proportionally reduces the communication rate used by each second communication means of the base terminal and the n remote terminals or reduces the communication rate of the base terminal and/or remote terminals that is not specified upon transfer of control from the base terminal to the n remote terminals.

The host computer exerts control so that the communications services provided by telecommunications carriers are received by the second communication means of each of the remote terminals, based on their remote terminal IDs and remote terminal ID information sent from the second communication means of each remote terminal. In this case, the host computer has a billing processing unit which processes the billing charged to the user having the base ID information, for communications services provided by telecommunications carriers.

The host computer controls connection service to, e.g., the Internet and other telephones as the communications services provided by telecommunications carriers.

Meanwhile, the remote terminals, being transferred some or all of the functions of the base terminal, communicate with the host computer via the second communication means.

Additionally, the remote terminals communicate with the host computer via the second communication means until receiving a control transfer halt signal via the first communication means signaling the halt of transfer of control.

DESCRIPTION OF REFERENCE NUMERAL

1. Portable telephone (base terminal)
2. PC (remote terminal)
3. Host computer
4. Responder
41. Communication unit (first communication means)
10. Portable telephone unit proper
11. CPU (control means)
12. Command input unit (control input means)
13. Transceiver unit (second communication means)
14. Antenna 15. Display unit (display means)
16. Microphone (telephone call means)
17. Speaker (telephone call means)
18. Vibrator
19. Memory
20. PC proper
21. CPU (control means)
22. Command input unit
23. Transceiver unit (second communication means)
24. Display unit
25. HDD
5. Interrogator
51. Communication unit (first communication means)

BEST MODE FOR CARRYING OUT THE INVENTION

Preferred embodiments of the present invention will be described in detail with reference to the drawings.

Figure 1:
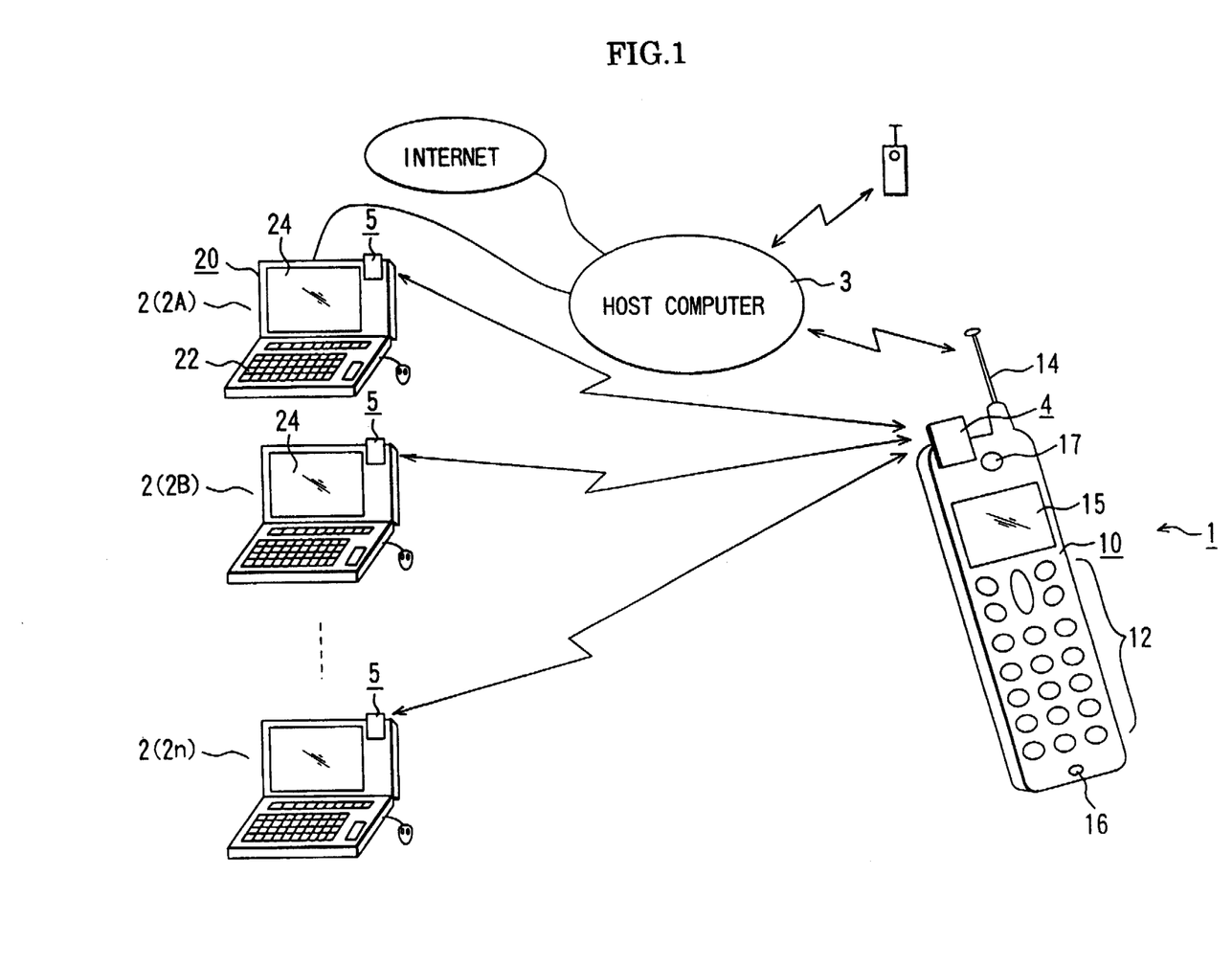
FIG. 1 is a diagram illustrating an overview of an embodiment of a telephone line control transfer system implementing the present invention.

FIG. 1. is a conceptual diagram of a telephone line control transfer system ("control transfer system") implementing the present invention.

As shown in FIG. 1, in this embodiment a portable telephone 1, which is a type of mobile communications terminal device, is used as the base terminal, a plurality of portable notebook computers ("PCs") 2 are used as the plurality of remote terminals, and each of the portable telephone 1 and PCs (2A, 2B, . . . , 2n) are capable of connecting to the host computer 3 controlling communications services provided by a telecommunications carrier. In the first embodiment, one portable telephone 1 communicates with each PC 2.

Outlined Constitution of the Base Terminal

The portable telephone 1, which is the base terminal, has a portable telephone unit proper 10 having the functions of a portable telephone, and a responder 4 as the first communication means, for communicating with each PC 2.

The portable telephone 1, which is the base terminal, has been pre-allocated a fixed communication rate (e.g. 2 Mbps), and has been configured with its own telephone line.

Figure 2:
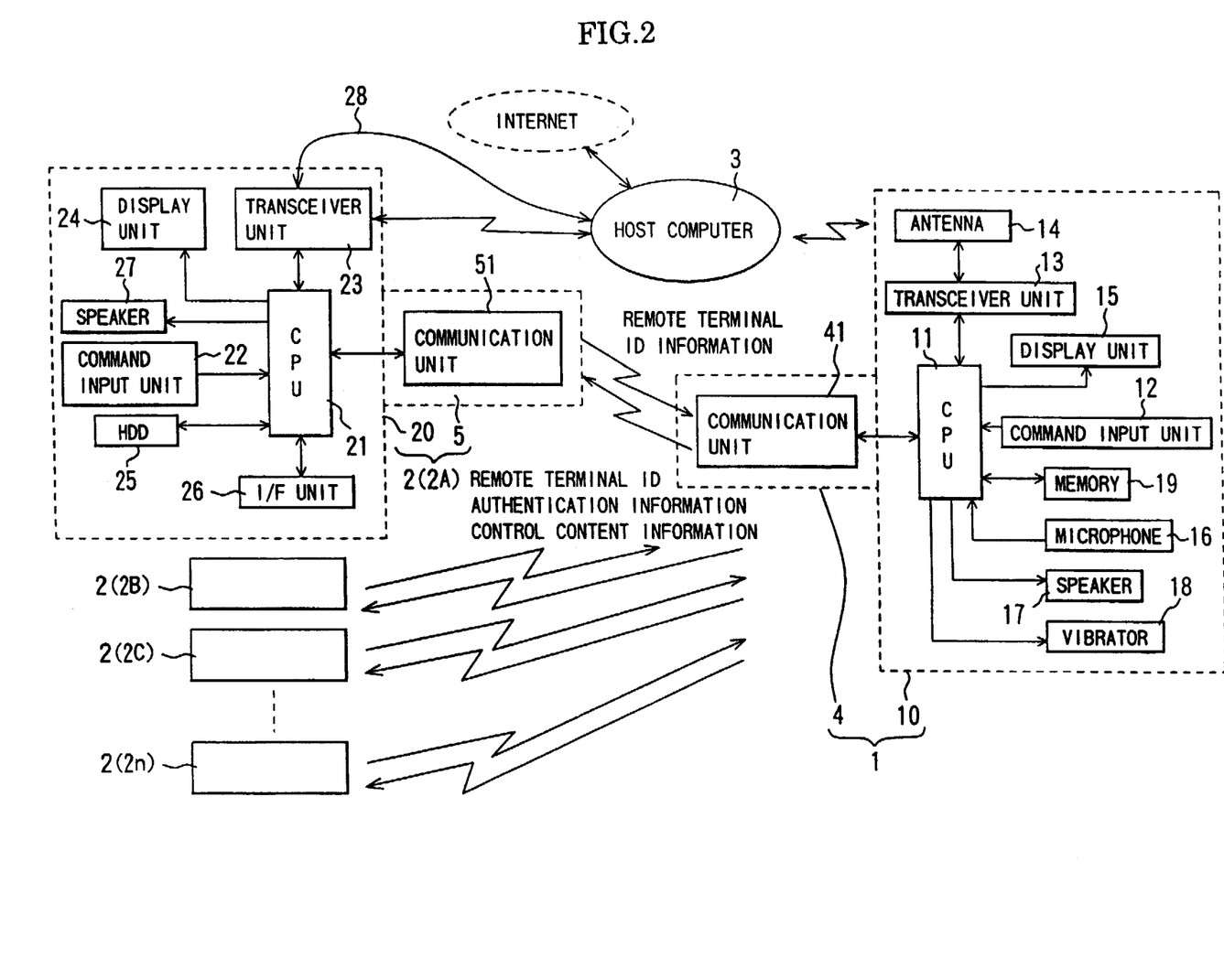
FIG. 2 is a block diagram illustrating the circuitry of a portable telephone (base terminal) and PC (remote terminal) shown in FIG. 1.

As shown in FIG. 1, in the present embodiment the portable telephone unit proper 10 of the portable telephone 1 has an antenna 14 installed at the top of the apparatus body (case), and on the front of the apparatus, from top down has a speaker 17 as the telephone call means, a display unit 15 as the display means, for example an LCD panel, a command input unit 12 comprising several key switches as the command input means, and a microphone 16 as the telephone call means. Note that the other compositional units of the portable telephone 1 are shown in FIG. 2. These will be described later. In addition, as shown in FIG. 1, in the present embodiment a responder 4 is integrated at the top part of the portable telephone unit proper 10. Naturally, however, this constitution is not limited thereto. It is also permissible for the responder 4 to be detachable from the portable telephone unit proper 10.

Outlined Constitution of the Remote Terminal

The PC 2, which is the remote terminal, has a PC proper 20 equipped with the functions of an ordinary computer, and an interrogator 5 as a first communication means for communicating with the portable telephone 1.

As shown in FIG. 1, in the present embodiment the PC 2 consists of the base of the PC proper 20, having a command input unit 22 consisting of multiple key switches, and an upper case which can be moved circularly forwards and backwards, having a display unit 24 comprising a liquid crystal display. The interrogator 5 is attached to the upper case. Here, the display unit 24 of the PC proper 20 of the PC 2 has a larger display (screen) area than the display unit 15 of the portable telephone 1, and the keys of the command input unit 22 are larger than the key switches of the command input unit 12 of the portable telephone 1.

In this embodiment, the interrogator 5 is integrally attached to the upper portion of the PC proper 20, but naturally the present invention is not limited thereto and it is also permissible for the interrogator 5 to be detachable from the PC proper 20.

Outlined Constitution of the Host Computer

The host computer 3 connects to the communications services provided by telecommunications carriers such as the Internet and other info-communications network. The host computer 3 provides a variety of services that meets requests from the above-mentioned base terminal or remote terminals. Here, the variety of services provided by the host computer 3 include connection to another telephone to be called via a wired or wireless line, and data transmission service as mentioned above to send various data via the Internet or other info-communications network.

Additionally, the host computer 3 has an authentication unit (not shown in the drawing), that determines whether a user is authorized to access or not, based on authentication information from the base terminal or remote terminal, and provides services in response to a request from the base terminal or remote terminal only in case that the authentication unit authenticates the user. The host computer 3 also has a billing processing unit (not shown in the drawing), that conducts prescribed billing processing for users that have been authenticated by the authentication unit.

Furthermore, the host computer 3 has a communication rate allocation unit (not shown in the figure) that pre-allocates a predetermined communication rate (e.g. 2 Mbps) to the portable telephone 1, which is the base terminal, and at a request from the portable telephone 1, allocates communication rate to multiple remote terminals selected by the portable telephone 1, within this communication rate range. Furthermore, the host computer 3 has a communication rate monitoring unit that monitors the communication rate from the portable telephone 1 and the plurality of remote terminals selected by the portable telephone 1 to the host computer 3, and adjusts the combined communication rate of the base and each remote terminal, so that it does not exceed the communication rate (e.g. 2 Mbps) of the base terminal.

Circuitry of Base Terminal

The circuitry of the portable telephone 1 and PC 2 will be described referring to FIG. 2. As shown in FIG. 2, the portable telephone unit proper 10 of the portable telephone 1 has a CPU 11 which controls the entire portable telephone 1, the command input unit 12 described in FIG. 1, a transceiver unit 13 and the antenna 14 as the second communication means for communication with the host computer 3, the display unit 15, the microphone 16 and the speaker 17 described in FIG. 1, a vibrator 18 that causes the entire portable telephone to vibrate, and a memory 19, to be described below, which stores various pieces of information.

The CPU 11 of the portable telephone proper 10 controls the transceiver unit 13, the display unit 15, the speaker 17, the vibrator 18, and the memory 19 based on a control program and commands entered via the command input unit 12 for controlling the portable telephone 1 as a whole. Additionally, the CPU 11 of the portable telephone proper 10 connects to the communications unit 41 of the responder 4, to be described below, and controls each unit based on signals input from the communication unit 41.

For example, when a telephone number of a telephone to which the line is to be connected is input via commands input to the portable telephone unit proper 10 by means of command input unit 12, the commands from the CPU 11 cause the corresponding telephone number to be displayed on the display unit 15, and causes a wireless signal to be sent to connect to the line of the party to be called, via the transceiver unit 13, and the antenna 14 connected to the transceiver unit 13. The host computer 3 receives the wireless signal sent by the portable telephone 1, and conducts processing aimed at connecting to the telephone of the party to be called.

Then, if a connection is established with the telephone of the party being called, the portable telephone unit proper 10, via the control of the CPU 11, outputs sound from the telephone of the party being called as sound through the speaker 17, and sound generated by the calling party in response is converted into electric signals via the microphone 16, processed via the transceiver unit 13, and sent as wireless signals for the purpose of the telephone call to the telephone of the party being called, via the antenna 14 and host computer 3.

Meanwhile, the portable telephone unit proper 10 receives wireless signals to open a connection sent from the telephone of a calling party via the host computer 3, by means of the transceiver unit 13 via the antenna 14. At this time, commands from the CPU 11 cause a ringing tone to be output through the speaker 17, or alternatively cause the vibrator 18 to vibrate in accordance with the setting entered through the command input unit 12, and upon receiving specified key commands from the called party via the command input unit 12, the portable telephone unit proper 10 connects to a line with the calling party, and as described above, enters a state in which a telephone call is possible with the telephone of the other party.

Furthermore, in the portable telephone unit proper 10, upon the entry of a telephone number to connect to the Internet via commands input from the command input unit 12, commands from the CPU 11 cause the corresponding telephone number to be displayed on the display unit 15, and causes wireless signals to be sent via the transceiver unit 13 and the antenna 14 connected to the transceiver unit 13, in order to connect to a line to the Internet. Here, the host computer 3 receives the wireless signal sent by the portable telephone 1, and conducts processing to connect to the Internet.

Then, upon connection to a line to the Internet, the portable telephone unit proper 10, via commands from the CPU 11, displays images, text e-mails, and other data sent from the Internet on the display unit 15, outputs audio data through the speaker 17, and stores data needed by this user in the memory 19, in accordance with commands entered through the command input unit 12.

In addition to this, the command input unit 12 of the portable telephone unit proper 10 is used to set each type of communication setting to communicate with the interrogator 5 of the PC 2 via the responder 4.

The memory 19 of the portable telephone unit proper 10 stores communication reports, described in detail below, sent from the interrogator 5 after communicating with the interrogator 5 of the PC 2, via the responder 4.

Additionally, the memory 19 stores telephone number data for the portable telephone 1 ("telephone number information"), and data regarding control functions ("control content information") transferred to remote terminals (PCs 2). This information is retrieved in response to commands from the CPU 11, and sent to the interrogators 5 of the PCs 2.

That is, the responder 4 of the portable telephone 1 has a communication unit 41 that sends data to the interrogator 5 of the PC 2, and receives data therefrom, the CPU 11 of the portable telephone unit proper 10 retrieves telephone number information and control content information from the memory 19, and supplies this information to the communication unit 41 along with the control signals, and outputs information from the communication unit 41 in the form of wireless signals. Note that the wireless signals can take the form of electromagnetic or infrared radiation, and the like.

Furthermore, before the responder 4 of the portable telephone 1 sends telephone number information and control content information, the communication unit 41 outputs a connection signal in order to establish a connection with the interrogator 5 of the PC 2, based on command from the CPU 11 of the portable telephone unit proper 10. This processing is described below.

Circuitry of Remote Terminals

Next, the circuitry of the PCs 2 of the remote terminals will be described. As shown in FIG. 2, the PC proper 20 of the PC 2 is equipped with a CPU 21 that conducts overall control of the PC proper 20, a command input unit 22 as described in FIG. 1, a transceiver unit 23 that has a modem which sends and receives data to/from the host computer 3 connected over a wired or wireless connection, the display unit described in FIG. 1, a hard disk drive (HDD) 25 that stores all sorts of data, and an interface unit (I/F unit) 26 for connecting to other external devices such as a printer, an external storage device, a modem card, other PCs, and speakers 27 to output sound.

The CPU 21 of the PC proper 20 controls the transceiver unit 23, the display unit 24, the HDD 25, the I/F unit 26, and the speakers 27, based on specific control programs and commands entered through the command input unit 22. Additionally, the CPU 21 of the PC proper 20 is connected to the communication unit 51 of the interrogator 5, as described below, and controls each unit based on signals input from the communication unit 51.

Suppose a case, for example, that the PC proper 20 is connected via a wired line to the telephone line 28 linked to the host computer 3 and the transceiver unit 23, and a telephone number for connection to the Internet is entered through the command input unit 22. In this case, commands from the CPU 21 cause the corresponding telephone number to be displayed on the display unit 24, and a signal to be sent to the host computer 3 in order to connect to a line to the Internet, via the transceiver unit 23 and the telephone line 28. The host computer 3 receives signals sent from the PC 2, and conducts processing to connect to the Internet.

Next, when the PC proper 20 connects to a line to the Internet, commands from the CPU 21 cause image data, e-mail text data, and other data sent over the Internet via the host computer 3 to be displayed on the display unit 24, sound data to be output as sound via the speakers 27, and data needed by the user to be stored in (downloaded to) the HDD 25, based on commands input from the command input unit 22.

In addition to this, the command input unit 22 of the PC proper 20 is used to configure various communicationsrelated settings with the responder 4 of the portable telephone 1, via the interrogator 5, which is described below.

The interrogator 5 of the PC 2 connects to the CPU 21 of the PC proper 20, and has a communication unit 51 to send and receive data to/from the responder 4 of the portable telephone 1.

The communication unit 51 of the interrogator 5 of the PC 2 outputs an acknowledge signal in order to establish a connection to the responder 4 of the portable telephone 1, based on the control signal output from the CPU 21 of the PC 20. This process is described below.

Transfer of Control from Base Terminal to Remote Terminals

In the present configuration of portable telephone 1 and PCs 2, the portable telephone 1, which is the base terminal, transfers control to the plurality of PCs 2A, 2B, . . . , 2n, which are the remote terminals, in the manner described below. As a result of this transfer of control, each PC 2 conducts processing that was originally conducted by the portable telephone 1, and the portable telephone 1 and each PC 2 are simultaneously communicating with the host computer 3.

Figure 3:
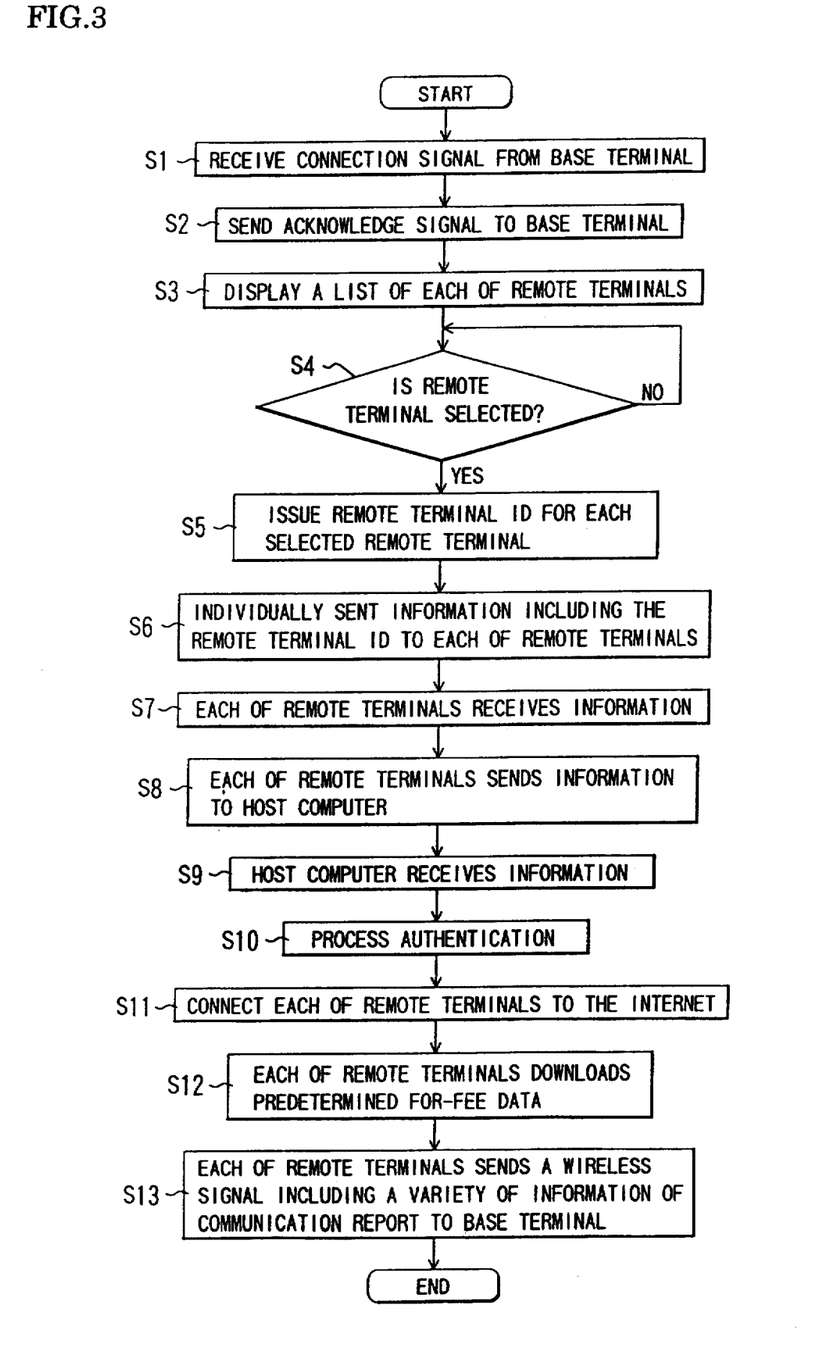
FIG. 3 is a flowchart illustrating the processing conducted upon transfer of control from the base terminal to each remote terminal.

Below will be described the processing carried out for transfer of control, referring to the flowchart of FIG. 3. Note that FIG. 3 is the flowchart to illustrate the processing conducted among the responder 4 of the portable telephone 1, each interrogator 5 of the plurality of PCs 2A, 2B, . . . , 2n, and the host computer 3.

In the present embodiment, the responder 4 of the portable telephone 1 approaches within a specific distance of each interrogator 5 of the PCs 2A–2n, and predetermined key switches on the command input unit 12 are pressed. At this time, connection signals are sent from the communication unit 41 of the responder 4 of the portable telephone 1, and each PC 2A–2n receives connection signals from the portable telephone 1, which is the base terminal (step S1).

Next, in step S2, PCs 2A–2n send acknowledge signals to the portable telephone 1. This acknowledge signal is different for each of the PCs, 2A–2n. For example, the acknowledge signal may include a unique piece of remote terminal ID information of the corresponding PC 2. Here, the unique piece of remote terminal ID information of the corresponding PC 2 is information that can be identified by the host computer 3. For example, this information may comprise the PC 2's product code, information pertaining to the owner of the PC 2, or the bank account number of the person owning the PC 2. Alternatively, if the PC 2 has a dedicated telephone number, this telephone number may be included.

When the portable telephone 1 receives the acknowledge signal from each of the PCs 2A–2n, next in step S3 it displays a list of each of the remote terminals (PCs 2A–2n) on the display unit 15, and prompts the user to enter a command via the command input unit 12 in order to select remote terminals to which control is transferred. The portable telephone 1 then proceeds to step S4, and goes into standby awaiting input from the command input unit 12. Note that in this example, the command input unit 12 is used to select all of the PCs 2A–2n.

After remote terminals have been selected via input to the command input unit 12 in step 4, the portable telephone 1 proceeds to step S5, and issues one remote terminal ID for each selected remote terminal. This remote terminal ID is an ID that the host computer 3 can recognizes as having been issued by the portable telephone 1 as the base terminal, and can be used by the host computer 3 to identify each of the plurality of remote terminals. In the present embodiment, a prescribed symbol is appended to the telephone number of the portable telephone 1, which is the base terminal, and this is used as the remote terminal ID. In this way, the base terminal issues telephone number information that is a different telephone number for each remote terminal.

To take a specific example, let the telephone number of the portable telephone 1 be 090-1234-5678. In this case, the number issued to the first remote terminal will be 090-1234-5678-01, that of the second will be 090-1234-5678-02, and so on. In this way, a series of incremental numbers is appended to the telephone number.

Note that the embodiment of the remote terminal ID is not limited to this example; it may be any ID that the host computer 3 can recognize as having been issued by the portable telephone 1 as the base terminal, and which can be used to identify each of the plurality of remote terminals.

Next, in step S6, the telephone number information in the form of the remote terminal IDs which have been generated is sent from the portable telephone 1 individually to each remote terminal. In the present embodiment, in step S6 the portable telephone 1, which is the base terminal, sends, separately to each remote terminal, the telephone number information, as well as its authentication information of the portable telephone 1 as the base terminal, and the control content information showing the content of the control transferred to the remote terminal. Here, the authentication information of the portable telephone 1 is, for example, a password entered by the user of the portable telephone 1, which can be changed as needed, when the user of the portable telephone enters the appropriate command via the command input unit 12.

Note that in this example, the control content transferred to each PC 2A–2n controls the downloading of specified for-fee data after accessing the Internet, which is an info-communications network. Control content information indicating the contents of control to be transferred is sent from the communication unit 41 of the portable telephone 1 to the respective communication units 51 of each PC 2A–2n. Usually, the control content information is stored in memory 19, and upon sending, for example, a list of this information is displayed on the display unit 15 of the portable telephone 1, and the user can manipulate the command input unit 12 to select from the list that is displayed; and as a result, the CPU 11 retrieves appropriate information from memory 19, and sends it from the communication unit 41 of the responder 4 in the form of wireless signals.

In this example, the same control content information is transferred to each PC 2A–2n as the remote terminals in order to send the same control content to each of PC 2A–2n. It is also permissible to transfer different control content to each remote terminal. This means that mutually distinct control content information is sent to each of PCs 2A–2n. For example, in order to set mutually distinct communication rate to each of PCs 2A–2n, the command input unit 12 is manipulated in order to send different control content information to each of PCs 2A–2n. If, for example, only the communication rate used by PC 2A is to be configured, the command input unit 12 is manipulated in order to send different control content information to PC 2A only.

When each PC 2A–2n receives the information in step S7 from the portable telephone 1, including telephone number information, authentication information, and control content information, the next step is S8. In this step, each PC appends its remote terminal ID information to the above information, and sends the result to the host computer 3. In step S9, the host computer 3 receives the information from each PC 2A–2n, then in step S10, the authentication unit authenticates the information by, for example, matching the telephone number information and authentication information, then next, in step S11, conducts processing to connect each remote terminal (PCs 2A–2n) to the Internet.

Here, if the control content information received from each PC 2A–2n contains information specifying the communication rate, the communication rate allocation unit of the host computer 3 allocates a communication rate to each PC 2A–2n so that each PC 2A–2n can communicate at the specified communication rate.

From now on, the communication rate monitoring unit of the host computer 3 monitors the Internet connection status of each PC 2A–2n to make sure that the combined communication rate of each PC 2A–2n does not exceed the communication rate of the base terminal (e.g. 2 Mbps). If the combined rate does exceed this rate, the host computer 3 adjusts it.

If the combined communication rate of each PC 2A–2n exceeds the rate held by the portable telephone 1 as the base terminal (e.g. 2 Mbps), the host computer 3 adjusts this rate as follows. For example, the communication rate monitoring unit may proportionally reduce the communication rate being used by the transceiver unit 23 of each PC 2A–2n. Alternatively, another way of adjusting the rate is for the host computer 3 to reduce the communication rate that has not been set for PC 2 upon transfer of control from the portable telephone 1 to each PC 2A–2n (when control content information is sent).

Furthermore, the billing processing unit of the host computer 3 processes billing in order to bill the user with authorization to use the telephone number of the portable telephone 1 for the connection (telephone) fee for the connection to the Internet by each PC 2A–2n.

Next, in step S12, each PC 2A–2n issues commands to download the prescribed for-fee data to the HDD 25 of PC proper 20. The billing processing unit of the host computer 3 then in turn bills the user with the authorization to use the telephone number of portable telephone 1 for the charges for the service fee (bill) for the for-fee data download.

When the download processing is finished, the interrogator 5 of each PC 2A–2n moves on to step S13, where it sends a wireless signal including each type of information regarding a communication report to the responder 4 of the portable telephone 1, completes its processing, and finishes the transfer of control from the portable telephone 1 to each PC 2A–2n. Here, the communication report includes such information as, for example, communication time or amount of time connected to the Internet, telephone charges, service fees (bills) for for-fee data downloads, and amount of data downloaded.

In order to terminate these processes of PC 2A–2n midway, the user of the portable telephone 1 conducts prescribed operations by means of the command input unit 12. These operations send a control transfer halt signal from the communication unit 41 of the responder 4 based on a command of the CPU 11 of the portable telephone 1, signaling that transfer of control is to be halted. When the communication unit 51 of each PC 2A–2n receives this signal, a command from the CPU 21 sends a connection termination command from the transceiver unit 23 to the host computer 3, and the host computer 3 carries out processes to sever the connection to the Internet, terminating the transfer of control from the portable telephone 1 to each PC 2A–2n.

In the present embodiment, the transfer of control from the base terminal to a plurality of remote terminals removes the need to set up a dedicated telephone number for each of the remote terminals PC 2A–2n, eliminating the burden of paying base fees for the rights to new telephone lines.

Moreover, even if dedicated telephone numbers have been set up for each of the remote terminals PC 2A–2n, the host computer 3 connects them to the Internet without regard to the telephone numbers. Since the number used by the host computer is based on the telephone number of the portable telephone 1 that is the base terminal, it is also unnecessary to modify the settings of telephone number on each PC 2A–2n before the connection. That is, in the present embodiment the user of the portable telephone 1, which is the base terminal, is billed for telephone charges, service fees, and other charges, no matter who the owner of each PC 2A–2n, the remote terminals, is. For example, if the PCs 2A–2n are located in one place which an unspecified large number of people gathered (e.g. a showroom), it is possible to bill the user of each PC 2A–2n or other party (in this case the user of the portable telephone 1) appropriately for necessary communication fees, service fees, etc of the services obtained regardless of owners of the respective PCs 2A–2n.

Additionally, the remote terminals, PCs 2A–2n, store the data they download on their HDD 25. This allows the portable telephone 1, which is the base terminal, to be kept more compact and lighter, because a greatly expanded memory 19 capacity is not required, and the capacity of the battery (not shown in drawings) would not need to be raised. Furthermore, since downloaded data can be retrieved from the HDD 25 and displayed on the display unit 24 of the PC proper 20, there is no need to enlarge the screen size of the display unit 15 of the portable telephone unit proper 10 in the portable telephone 1 acting as the base terminal. This also allows the portable telephone 1 to be kept more compact and lighter.

Furthermore, since the volume of data exchanged between the responder 4 of the base terminal and the interrogators 5 of the remote terminals is small, it is possible to create a simple interface between the responder 4 and interrogator 5, via the communication units 41 and 51.

Note that in the above-mentioned embodiments, while a preferred embodiment was described in which the transceiver unit 23 of the remote terminal PCs 2 is connected to the Internet from the host computer 3 by way of a wired line and downloads data from the Internet, it is also possible to connect the remote terminal to the Internet and download data in the same manner via a wireless line.

The above-mentioned embodiments described a preferred embodiment in which the base terminal was a portable telephone 1 comprising a responder 4 and a portable telephone unit proper 10, but the constitution of the base terminal is not limited to this. It is also applicable for various kinds of terminals to which the responder 4 is detachable, or built-in. This makes it optimal for such mobile communications terminal devices as personal handyphone systems (PHS) and personal digital assistants (PDA). In addition, in the above-mentioned embodiments, it is not necessary for the base terminal to communicate with the host computer 3, so the system can be optimally implemented with such products as a so-called remote controller or an IC card.

Note that in the preferred embodiments mentioned above, the portable telephone 1, which is the base terminal, transferred all of its communication rate (2 Mbps) to the remote terminals, PCs 2A–2n. In this case, while remote terminals, PCs 2A–2n, are communicating, there will be no more communication rate left for the portable telephone 1, which is the base terminal, preventing the portable telephone 1 from communicating with the host computer 3 via its transceiver unit 13 and antenna 14.

Instead, it is possible to transfer only a portion of the communications rate (2 Mbps) from the portable telephone 1 to the PCs 2A–2n (e.g. 1 of 2 Mbps). In this case, it will be possible for the base terminal, the portable telephone 1, and remote terminals, PCs 2A–2n, to communicate with the host computer 3 simultaneously, making data communications and other applications between the portable telephone 1 and the PCs 2A–2n via the host computer 3 possible.

Note that in this case, it is possible for the host computer 3's authentication unit to authenticate, its communication rate allocation unit to allocate communication rate, its communication rate monitoring unit to monitor and adjust communication rates, and its billing processing unit to process billing for both the portable telephone 1 and PCs 2A–2n, just as with the processes described above.

In the above-mentioned embodiments, the preferred embodiments are described in which the remote terminals are PCs 2 comprising an interrogator 5 and a PC proper 20, but the constitution of the remote terminals is not limited to this. It is also possible to optimally configure a remote terminal with a detachable interrogator 5, or use one of various types of electrical product with a built-in interrogator feature.

One example of an electrical product with a detachable or built-in interrogator 5 is the use of a portable telephone with the same constitution as the base terminal 1. Examples thereof further include electrical devices at home and office, including television sets, radios, cameras, image and audio recording/reading devices, air conditioners and heaters, microwave ovens, facsimile machines, and others, as well as public devices utilized by an unspecified large number of users such as all types of vending machines. By giving these electrical products the capability to communicate with the host computer 3, they can receive a variety of services via the host computer 3, without being assigned their own telephone numbers.

The content of control that can be transferred from the base terminal to the remote terminals is not limited to the embodiments listed above. For example, in the case that the remote terminals are portable telephones, it is possible to transfer such contents of control as receive-only mode, send-only mode, and send-receive mode.

In addition, in the embodiments described above, the sending and receiving of data between the base terminal and remote terminals took place via wireless signals, but it is naturally also permissible to do this via wired signals.

Industrial Applicability

With the constitution described above, the present invention will be of great use to industry. This invention makes it possible to offer a system that helps to improve the level of service to users, effectively using telephone lines and billing users according to their intentions, when accessing info-communication networks.

What is claimed is:

1. A telephone line control transfer system, comprising:
   a host computer which controls communications services provided by telecommunications carriers;
   a base terminal having base ID information which said host computer can identify; and
   a plurality of remote terminals having remote terminal ID information which said host computer can identify, and which, upon receiving transfer of control from said base terminal, communicate with said host computer;
   said base terminal having:
   a first communication means to communicate with each remote terminal;
   a selection means to select n remote terminals (n being an integer greater than or equal to 1) to which control is to be transferred from among the remote terminals which have communicated via the first communication means; and
   a control means to control said first communication means;
   said remote terminals having:
   a first communication means to communicate with said base terminal;
   a second communication means to communicate with said host computer; and
   a control means to control said first communication means and said second communication means;
   said control means of said base terminal controlling said first communication means in order to generate n remote Ids based on said base ID information, from which said host computer can specify the base ID information, for n remote terminals selected using said selection means, and send the generated remote IDs in turn to each remote terminal; and
   said control means of each of said remote terminals controlling said second communication means in order to, upon receipt of said remote terminal ID from said base terminal via said first communication means, append said remote terminal ID information to said received remote terminal ID, and send the results thereof to said host computer via said second communication means.

2. The telephone line control transfer system according to claim 1, wherein said base ID information is a telephone number of user of said base terminal.

3. The telephone line control transfer system according to claim 1, wherein said base terminal is equipped with a second communication means to communicate with said host computer.

4. The telephone line control transfer system according to claim 3, wherein said second communication means of said base terminal communicates with said host computer within communication rate range pre-allocated by said host computer.

5. The telephone line control transfer system according to claim 4, wherein said base terminal transfers control of the content communicated simultaneously to said host computer via said second communication means of each of said n remote terminals, within the communication rate range pre-allocated by said host computer.

6. The telephone line control transfer system according to claim 5, wherein said base terminal, upon transfer of control, specifies communication rate used by said second communication means for at least one of said n remote terminals.

7. The telephone line control transfer system according to claim 4, wherein said base terminal transfers control of the content communicated simultaneously to said host computer via said second communication means of said base terminal and said second communication means of said n remote terminals, within the communication rate range pre-allocated by said host computer.

8. The telephone line control transfer system according to claim 7, wherein said base terminal, upon transfer of control, specifies communication rate used by said second communication means for said base terminal and/or at least one of said n remote terminals.

9. The telephone line control transfer system according to claim 5, wherein said host computer has a communication rate monitoring unit which monitors the combined communication rate of communications by said base terminal and each of said n remote terminals via each second communication means, and adjusts it so that it falls within the communication rate range pre-allocated to said base terminal.

10. The telephone line control transfer system according to claim 9, wherein said communication rate monitoring unit of said host computer proportionally reduces the communication rate used by each second communication means of said base terminal and said n remote terminals, in the event that the combined communication rate of communications by said base terminal and each of said n remote terminals via each second communication means exceeds the communication rate range pre-allocated to said base terminal.

11. The telephone line control transfer system according to claim 6, wherein said communication rate monitoring unit of said host computer reduces the communication rate of said base terminal and/or said remote terminals that is not specified upon transfer of control from said base terminal to said n remote terminals, in the event that the combined communication rate of communications by said base terminal and each of said n remote terminals via each second communication means exceeds the communication rate range pre-allocated to said base terminal.

12. The telephone line control transfer system according to claim 1, wherein said host computer controls so that the communications services provided by telecommunications carriers are received by said second communication means of each of said remote terminals, based on said remote terminal ID and said remote terminal ID information sent from said second communication means of each of said remote terminals.

13. The telephone line control transfer system according to claim 12, wherein said host computer has a billing processing unit which processes billing charged to the user who has the base ID information, for the communications services provided by telecommunications carriers.

14. The telephone line control transfer system according to claim 1, wherein said host computer controls Internet connection services as the communications services provided by telecommunications carriers.

15. The telephone line control transfer system according to claim 1, wherein said host computer controls connection services to other telephones-as the communications services provided by telecommunications carriers.

16. The telephone line control transfer system according to claim 1, wherein said control means controls said first communication means so that said base terminal sends said remote terminal IDs, authentication information, and control content information showing control content to be transferred, to each of n remote terminals selected via said selection means.

17. The telephone line control transfer system according to claim 1, wherein said selection means of said base terminal includes a display means to display a list of remote terminals which have communicated via said first communication means, and a configuration input means to configure n remote terminals from among the list of remote terminals displayed by said display means, to which control is to be transferred.

18. The telephone line control transfer system according to claim 1, wherein some or all of the functions of said base terminal are transferred to said remote terminals, which communicate with said host computer via said second communication means.

19. The telephone line control transfer system according to claim 1, wherein said remote terminals communicate with said host computer via said second communication means until receiving a control transfer halt signal via said first communication means signaling the halt of transfer of control.

20. The telephone line control transfer system according to claim 2, wherein said base terminal is equipped with a second communication means to communicate with said host computer.

21. The telephone line control transfer system according to claim 8, wherein said communication rate monitoring unit of said host computer reduces the communication rate of said base terminal and/or said remote terminals that is not specified upon transfer of control from said base terminal to said n remote terminals, in the event that the combined communication rate of communications by said base terminal and each of said n remote terminals via each second communication means exceeds the communication rate range pre-allocated to said base terminal.

* * * * *